United States Patent
Olsen et al.

(10) Patent No.: US 8,587,423 B2
(45) Date of Patent: Nov. 19, 2013

(54) SYSTEMS AND METHODS FOR PROVIDING DRIVER SHIFT AIDS

(75) Inventors: Stephan Olsen, Kirkland, WA (US);
Ethan A. Ott, Portland, OR (US);
Zachary Slaton, Seattle, WA (US);
Mark Nievelstein, Eindhoven (NL)

(73) Assignee: PACCAR Inc, Bellevue, WA (US)

( * ) Notice: Subject to any disclaimer, the term of this patent is extended or adjusted under 35 U.S.C. 154(b) by 284 days.

(21) Appl. No.: 13/205,432

(22) Filed: Aug. 8, 2011

(65) Prior Publication Data
US 2013/0038438 A1  Feb. 14, 2013

(51) Int. Cl.
*B60Q 1/00* (2006.01)
*G08B 1/00* (2006.01)
*G06F 17/00* (2006.01)
*F16H 57/08* (2006.01)

(52) U.S. Cl.
USPC ........... 340/439; 340/438; 340/441; 340/456; 340/461; 701/51; 701/64; 475/158

(58) Field of Classification Search
USPC ..................... 340/439, 456; 701/64
See application file for complete search history.

(56) References Cited

U.S. PATENT DOCUMENTS

| | | | |
|---|---|---|---|
| 4,439,158 A | 3/1984 | Weber | |
| 4,559,599 A | 12/1985 | Habu | |
| 4,622,637 A | 11/1986 | Tomita | |
| 4,731,727 A * | 3/1988 | Rauch et al. ................. | 701/123 |
| 5,017,916 A | 5/1991 | Londt | |
| 5,182,710 A | 1/1993 | Tomisawa | |
| 5,425,689 A | 6/1995 | Genise | |
| 5,477,452 A | 12/1995 | Milunas | |
| 6,137,399 A | 10/2000 | Westberg | |
| 6,356,831 B1 | 3/2002 | Michelini | |
| 6,692,406 B2 | 2/2004 | Beaty | |
| 6,707,379 B2 | 3/2004 | Nagasaka | |
| 6,985,804 B2 | 1/2006 | Minami | |
| 2002/0055410 A1 | 5/2002 | Nagasaka | |
| 2007/0179694 A1 | 8/2007 | McMullen | |
| 2009/0076692 A1 | 3/2009 | Aigner | |
| 2010/0259374 A1 | 10/2010 | Matsuo | |
| 2011/0043348 A1 | 2/2011 | Blackard | |

FOREIGN PATENT DOCUMENTS

| | | |
|---|---|---|
| EP | 2 336 603 A2 | 6/2011 |
| JP | 2002-264684 A | 9/2002 |

OTHER PUBLICATIONS

International Search Report and Written Opinion mailed Nov. 14, 2012, issued in corresponding International Application No. PCT/US2012/049933, filed Aug. 8, 2012, 7 pages.
Bylsma, W., "Real-Time Powertrain Module for Vehicle Simulation," Technical Report 13811, U.S. Army Tank-Automotive and Armaments Command/National Automotive Center, Warren, Mich., Mar.-Apr. 2002, 65 pages.

* cited by examiner

*Primary Examiner* — Donnie Crosland
(74) *Attorney, Agent, or Firm* — Christensen O'Connor Johnson Kindness PLLC

(57) ABSTRACT

Systems and methods for displaying a driver shift aid are disclosed. In one aspect, an electronic control unit causes a shift indicator to be presented if a need for a shift is detected and vehicle performance after the shift would not be unduly impacted. If the vehicle operator follows the guidance of the shift indicator, vehicle fuel efficiency may be improved while vehicle performance remains adequate. In one aspect, a different indicator may be displayed to prompt the vehicle operator to shift either one gear or two gears.

24 Claims, 9 Drawing Sheets

SYSTEMS AND METHODS FOR PROVIDING DRIVER SHIFT AIDS

BACKGROUND

For entities that operate trucks or other vehicles to ship goods from place to place, the efficiency of doing so has a major impact on the cost of conducting business. Such entities can experience major reductions in cost if the vehicles are operated in the most efficient manner possible, especially when the efficiencies are multiplied over large fleets of vehicles operated over routes that each span thousands of miles.

One focus of improving the efficiency of the operation of vehicles is to improve fuel economy. Fuel economy is improved when the operator of the vehicle uses an ideal gear position that allows the engine RPM to be as low as possible, while at the same time meeting the current performance requirements of the vehicle with regard to traffic conditions, road characteristics, and/or the like. While operators had traditionally attempted to select an ideal gear position through training, experience, and guesswork, recent attempts have been made to provide indications to the operator of the ideal gear position at a given time.

While those attempts use wheel torque or preconfigured engine speed set points to determine when to display a shift notification, what is needed is a system and method for displaying shift notifications to a vehicle operator that takes into account more sources of information than mere preconfigured engine speed thresholds and/or wheel torque ratios, to help vehicle operators improve fuel efficiency while maintaining a perceived level of vehicle performance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method for present a shift indicator in a vehicle is provided. One or more vehicle performance characteristics are monitored. Based on the vehicle performance characteristics, a determination is made that fuel consumption would be lowered by switching to a different transmission gear ratio of a manual transmission of the vehicle. Based on the vehicle performance characteristics, a determination is made that minimum driveability would be maintained after switching to the different transmission gear ratio. A shift indicator is presented instructing an operator of the vehicle to switch to the different transmission gear ratio in response to determining that fuel consumption would be lowered and minimum driveability would be maintained.

In another embodiment, a method for lowering fuel consumption in a vehicle is provided. A need to shift is detected based on a plurality of current vehicle operating conditions, the vehicle operating in a first transmission gear. A first predicted vehicle operating condition is calculated based on switching to a second transmission gear. A second predicted vehicle operating condition is calculated based on switching to a third transmission gear. The first predicted vehicle operating condition and the second predicted vehicle operating condition are compared to a desired vehicle operating condition. A prompt is presented to a vehicle operator to switch to the second transmission gear in response to determining that the second transmission gear and not the third transmission gear meets the desired vehicle operating condition. A prompt is presented to the vehicle operator to switch to the third transmission gear in response to determining that the third transmission gear meets the desired vehicle operating condition.

In yet another embodiment, a system for presenting a shift indicator in a vehicle is provided. The system comprises one or more electronic control units. The one or more electronic control units are configured to monitor one or more vehicle performance characteristics; determine, based on the vehicle performance characteristics, that fuel consumption would be lowered by switching to a different transmission gear ratio of a manual transmission of the vehicle; determine, based on the vehicle performance characteristics, that minimum driveability would be maintained after switching to the different transmission gear ratio; and present a shift indicator instructing an operator of the vehicle to switch to the different transmission gear ratio in response to determining that fuel consumption would be lowered and minimum driveability would be maintained.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure is directed to several examples of systems and computer-implemented methods of calculating an "ideal" gear ratio for a vehicle, and of dynamically displaying a shift indicator when it is determined that an operator should be prompted to shift to the "ideal" gear ratio. Specifically, a number of pieces of data concerning the operating state of the vehicle are gathered to determine the "ideal" gear ratio, and an indicator is displayed to the operator, when appropriate, that prompts the operator to shift one or two gears. As described in several examples below, the shift indicator may be prohibited from being displayed upon certain operating conditions.

In one aspect, an electronic control unit causes a shift indicator to be presented if a need for a shift is detected and vehicle performance after the shift would not be unduly impacted. For instance, the electronic control unit may determine a minimum engine speed after a shift using, for example, a deceleration factor based upon current driveline power demanded by the operator, and may cause the shift indicator to be activated if the engine speed after the shift would be greater than a threshold engine speed value or if the vehicle acceleration would be greater than a threshold acceleration value. As another example, the electronic control unit may calculate an amount of reserve torque available after a proposed shift event is executed, an ability to maintain the peak power one gear down or up, or a current rate of vehicle acceleration, and may determine whether to cause the shift indicator to be activated based on the calculations. The electronic control unit may perform these calculations for an adjacent gear, and may also perform these calculations for a gear two gears away from a current gear.

In another aspect, the electronic control unit may refrain from activating the shift indicator based on previous activations of the shift indicator. For example, if the shift indicator has been displayed for a predetermined amount of time and the shift event was not completed, the electronic control unit may cause the shift indicator to be deactivated. As another example, the electronic control unit may refrain from activating the shift indicator if a period of time since a previous activation of the shift indicator is less than a threshold period of time, to help prevent gear hunting.

It will be appreciated that in some embodiments, an electronic control unit can be configured so that the shift indicator is not presented if a number of conditions for enabling the shift indicator are not met. For example, the electronic control unit may check to make sure that a minimum vehicle speed, a minimum gear ratio, and a maximum gear ratio are all met. The electronic control unit may also refuse to enable the shift indicator if a power take off (PTO) is being used. The electronic control unit may allow each of these enablement thresholds to be configured by the owner.

Figure 1:
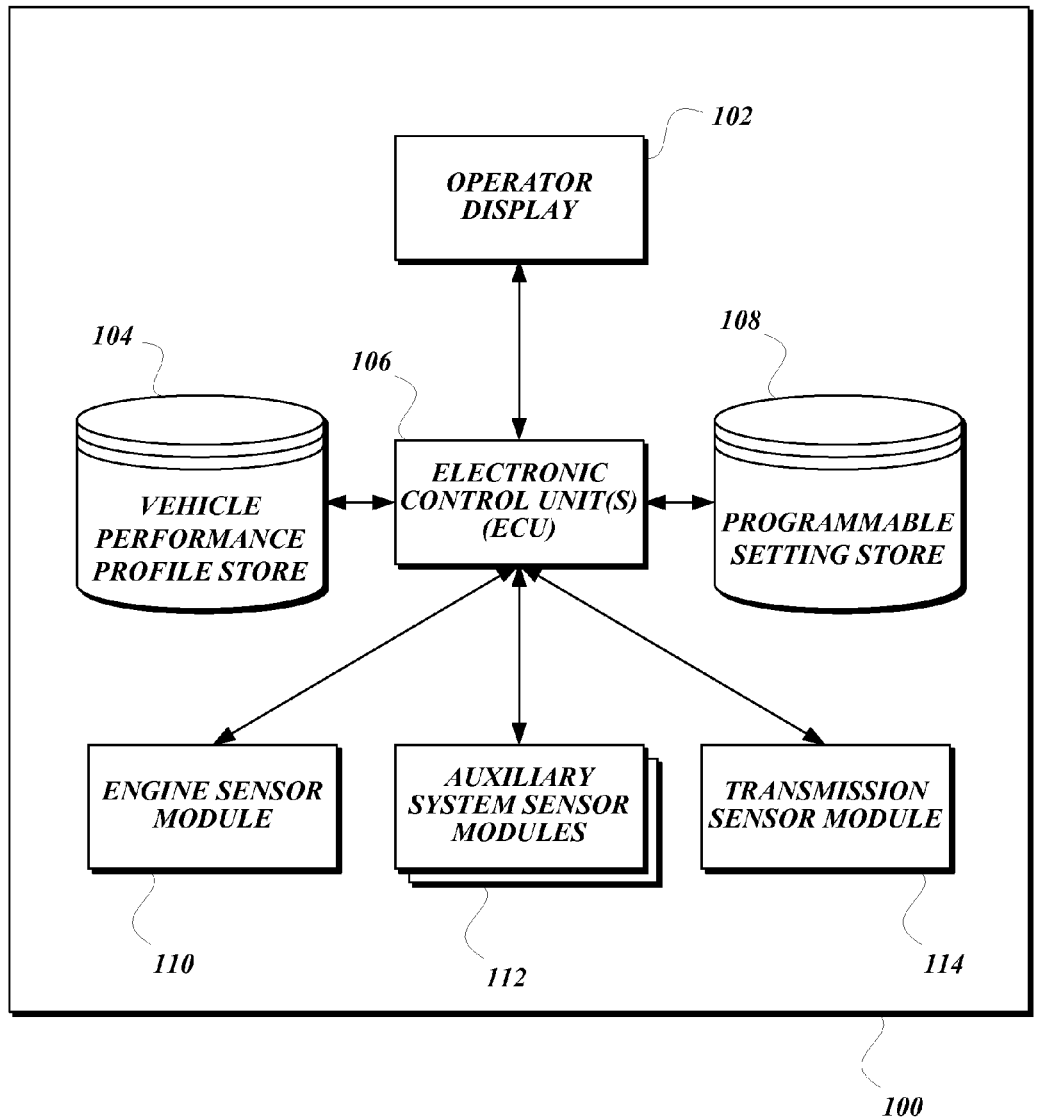
FIG. 1 illustrates one embodiment of a system for displaying a shift indicator according to various aspects of the present disclosure.

FIG. 1 illustrates one embodiment of a system for displaying a shift indicator according to various aspects of the present disclosure. A vehicle 100 includes one or more electronic control units (ECU) 106 which monitors vehicle status and causes a shift indicator to be presented by an operator display 102 when appropriate. The operator display 102 may be any type of display used in a vehicle to convey information to the operator. For example, the operator display 102 may include an LCD video screen display configured to display information to the operator much as any other computing display. As another example, the operator display 102 may include special purpose lighted displays, needle gauges, and/or the like. The operator display 102 may also include speakers or haptic feedback devices, such as vibrating motors, to provide information to the operator via audible or tactile means. In one embodiment, the vehicle 100 may be a vehicle powered by an internal combustion engine, such as a car, van, truck, and/or the like, that includes a transmission that may be manually controlled by the operator.

It will be appreciated that the ECU 106 can be implemented in a variety of hardware, software, and combination hardware/software configurations, for carrying out aspects of the present disclosure. In one embodiment, the ECU 106 may include a memory and a processor. In one embodiment, the memory comprises a random access memory ("RAM") and an electronically erasable, programmable, read-only memory ("EEPROM"). Those of ordinary skill in the art and others will recognize that the EEPROM may be a non-volatile memory capable of storing data when a vehicle 100 is not operating. The RAM may be a volatile form of memory for storing program instructions that are accessible by the processor. Typically, a fetch and execute cycle in which instructions are sequentially "fetched" from the RAM and executed by the processor is performed. In this regard, the processor is configured to operate in accordance with program instructions that are sequentially fetched from the RAM. The memory may include program modules, applications, instructions, and/or the like that are executable by the processor.

In one embodiment, the ECU 106 is communicatively coupled to various modules that provide status information concerning various states of the vehicle 100. For example, the ECU 106 may be communicatively coupled to an engine sensor module 110 configured to provide information about a condition of an engine of the vehicle 100. In some embodiments, the engine sensor module may provide information such as an engine speed, an engine power output, and/or the like. The ECU 106 may also be communicatively coupled to a transmission sensor module 114 configured to provide information about a condition of a transmission. For example, the transmission sensor module 114 may provide information such as a state of a driveline (open or closed), a currently selected gear or gear ratio, and/or the like. The ECU 106 may also be communicatively coupled to one or more auxiliary system sensor modules 112 configured to provide information about components of the vehicle 100 other than the engine or transmission. For example, an auxiliary system sensor module 112 may provide the ECU 106 with information concerning the activation of a power-take off (PTO) device, activation of a stability control system, activation of an anti-lock braking system, speed or torque requests made by a transmission controller, and/or the like.

In one embodiment, a module includes or is associated with at least one sensor to determine at least one physical state of the vehicle, along with appropriate computing or mechanical resources to transmit the determined physical state to other components of the vehicle. For example, the engine sensor module 110 may include a temperature sensor, an analog-to-digital converter configured to convert the output of the temperature sensor to a digital value, and a computing device configured to transmit the digital value to the electronic control unit 106. Any type of suitable sensor or computing device known to one of ordinary skill in the art may be used to create the modules discussed herein.

The components described herein as "communicatively coupled" may be coupled by any suitable means. In one embodiment, components may be connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineer's ("SAE") J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed in-vehicle communication systems without departing from the scope of the claimed subject matter.

The ECU 106 may also be communicatively coupled to a vehicle performance profile store 104 and a programmable setting store 108. Each of the stores includes a computer-readable storage medium that has stored thereon the data described herein. One example of a store is a hard disk drive, but any other suitable nonvolatile computer-readable storage medium, such as an EEPROM, flash memory, and/or the like may be used.

In one embodiment, the vehicle performance profile store 104 stores data usable to predict performance of the vehicle in various situations. For example, the vehicle performance profile store 104 may store a torque map for the vehicle engine that indicates an amount of torque provided by the vehicle engine at various engine speeds. The vehicle performance profile store 104 may also store information identifying gear ratios provided by the vehicle transmission.

The programmable setting store 108 is configured to store one or more settings that may be used by the ECU 106 to determine conditions under which the shift indicator should be presented. The one or more settings may be set to a default value, or may be reset to a different value by a vehicle owner. In one embodiment, the programmable setting store 108 may also store a lower bound value and an upper bound value for each setting. In one embodiment each setting may be changed via a user interface provided within the vehicle 100. In another embodiment, each setting may be programmed during manufacture of the vehicle 100, via a service tool, etc.

Examples of settings stored in the programmable setting store 108 include, but are not limited to:

Driver Shift Aid Engine Speed Limit (DSAESL): This setting represents an engine speed threshold that may be used by the ECU to determine whether or not to present the shift indicator. In one embodiment, this setting may be set to a value between a low value at the low end of a peak torque range, and a high value at the rated engine speed. In one embodiment, a default value for this setting may be at an upper end of a green band or "sweet spot" that correlates to the engine's most fuel efficient operating range.

Disable Gear Ratio (DGR): This setting represents a gear ratio threshold that may be used by the ECU to determine whether or not to present the shift indicator. The DGR helps prevent the shift indicator from being unnecessarily presented when using one of a set of high gears to operate at typical highway speeds and/or when the vehicle is already in its highest gear. In one embodiment, this setting may be set to a value between about 0.64 and about 150, and may have a default value of about 1.05.

Maximum Gear Ratio (MGR): This setting represents a gear ratio threshold that may be used by the ECU to determine whether or not to present the shift indicator. The MGR helps prevent the shift indicator from being unnecessarily presented when using one of a set of low gears to accelerate, thereby lessening annoyance to the operator. In one embodiment, this setting may be set to a value between about 0.74 and about 150, and may have a default value of about 4.0.

Shift Indication Time Delay ($t_{delay}$): This setting represents a time delay between a point when the ECU determines that the shift indicator should be presented and the actual presentation of the shift indicator to the operator. In one embodiment, this setting may be set to a value between zero and about 100 seconds, and may have a default value of zero.

Minimum Engine Speed After Shift ($N_{min}$): This setting represents an engine speed threshold that may be used by the ECU to determine whether or not to present the shift indicator. In one embodiment, if a predicted engine speed after shifting to a higher gear would be lower than the $N_{min}$ value, the shift indicator should not be presented. In one embodiment, this setting may be set to a value between a base idle speed such as about 650 RPM and about 2100 RPM, and may have a default value at the first engine speed of the peak torque band.

Time at Constant Power ($t_{power}$): This setting represents a threshold duration for which the vehicle may remain within a given power band before the shift indicator will be presented. In one embodiment, this setting may be set to a value between zero and about 600 seconds, and may have a default value of about 2 seconds.

Minimum Vehicle Speed ($V_{min}$): This setting represents a threshold speed faster than which the vehicle may be traveling before the shift indicator will be presented. In one embodiment, this setting may be set to a value between zero and about 200 MPH, and may have a default value of about 10 MPH.

High Power ($P_{high}$): This setting represents a threshold power over which the output power of the engine may remain in order for the shift indicator to be presented. In one embodiment, this setting may have a default value of about 95% of peak power available in the engine rating.

The above settings are examples only. In other embodiments, more or fewer variables may be stored in the programmable setting store 108, and/or the values stored therein may be different.

FIGS. 2A-2G illustrate one embodiment of a method 200 for presenting a shift indicator according to various aspects of the present disclosure. From a start block, the method 200 proceeds to a procedure 202, in which an electronic control unit (ECU) confirms that a shift indicator is enabled. The procedure 202 is described further below in relation to FIG. 2B. In some embodiments, the enablement of the shift indicator may serve as a prerequisite for determining whether the shift indicator should or should not be presented at a given time.

Next, the method 200 includes a procedure 204, in which the ECU monitors vehicle state to detect a need to shift. The procedure 204 is described further below in relation to FIG. 2C. The method 200 then proceeds to a procedure 205, in which the ECU monitors vehicle state to ensure minimum driveability after shift. The procedure 205 is described further below in relation to FIG. 2D.

Once a need to shift and a minimum driveability after shift have been confirmed, the method 200 then proceeds to a procedure 206, in which the ECU causes presentation of a shift indicator to a vehicle operator. This procedure 206 is described further below in relation to FIG. 2E, and may include an indication that shifting one gear is appropriate, or may also include an indication that shifting more than one gear is appropriate.

Once the shift indicator is presented, the method 200 proceeds to an OR switch, and performs either a procedure 208 or a procedure 210. In procedure 208, the ECU detects less than desired driveability. In procedure 210, the ECU detects a lost need to shift. Procedure 208 and procedure 210 are described further below in relation to FIG. 2F and FIG. 2G, respectively.

From either procedure 208 or procedure 210, the method 200 proceeds to block 212, where the ECU causes the presentation of the shift indicator to end. As will be discussed further below with respect to causing presentation of the shift indicator, in one embodiment the ECU may send a signal to an operator display that causes the operator display to cease presenting the shift indicator. In other embodiments, the ECU may cause the shift indicator to no longer be presented by any other suitable means. The method 200 then proceeds to an end block and terminates.

Figure 2A:
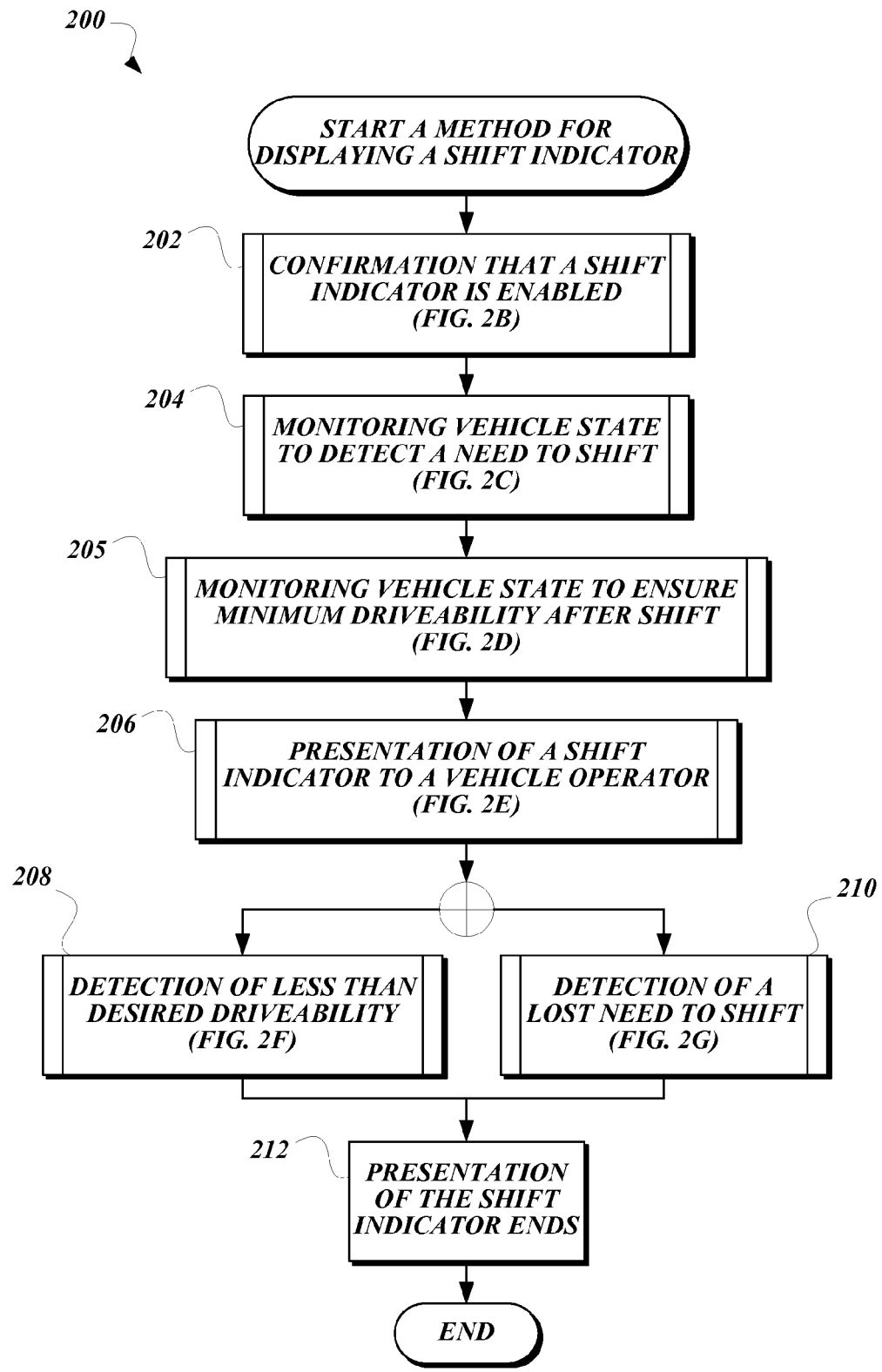
FIGS. 2A-2G illustrate one embodiment of a method for presenting a shift indicator according to various aspects of the present disclosure.
Figure 2B:
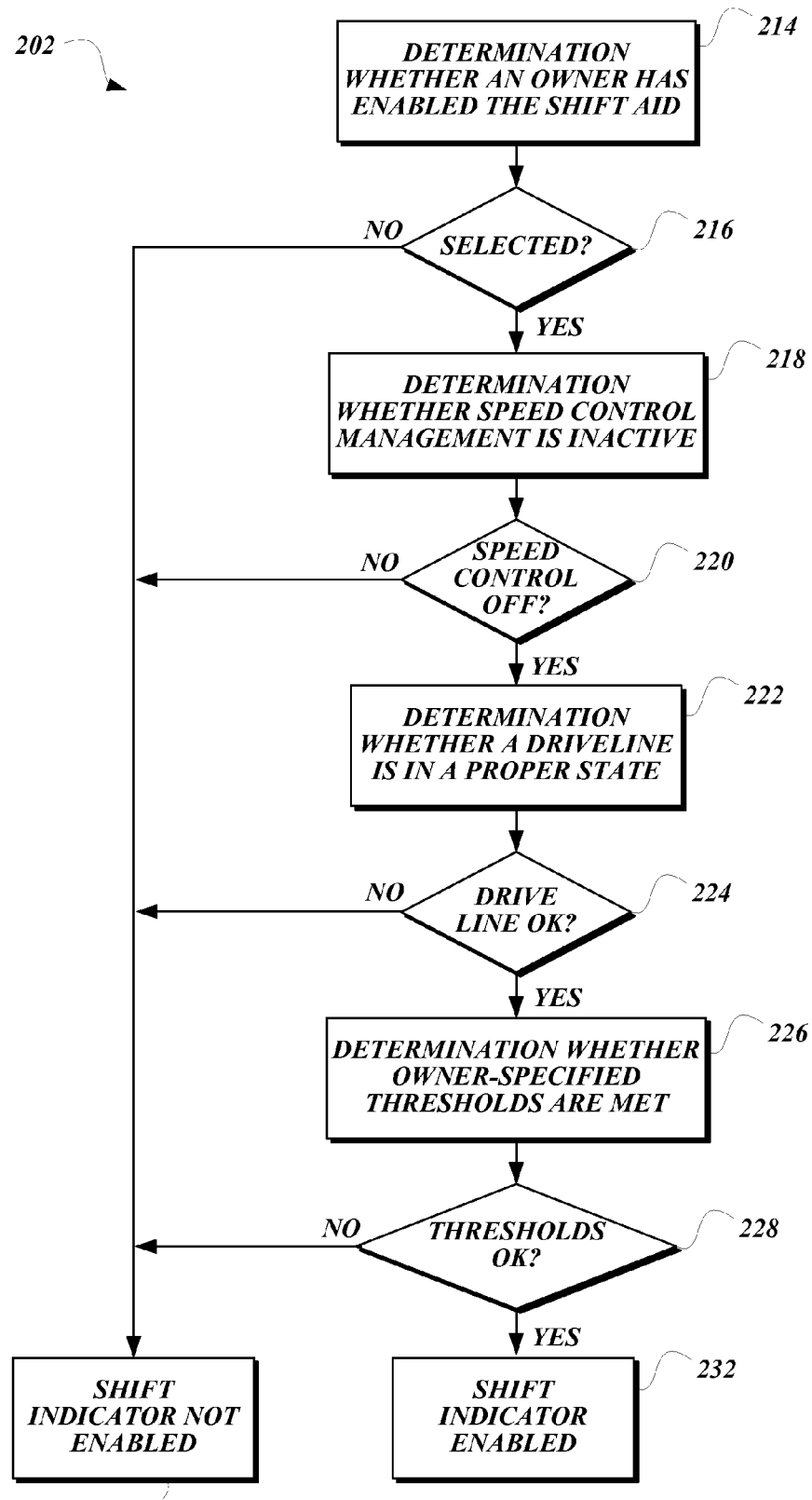

FIG. 2B illustrates further details of one example of a procedure 202 in which an ECU 106 determines whether a shift indicator should be enabled. At block 214, the ECU 106 determines whether an owner has enabled the shift aid. In one embodiment, the ECU 106 retrieves a setting from the programmable setting store 108 to determine whether the owner has selected, or turned on, the shift aid. At decision block 216, the procedure 202 proceeds to block 230, and does not enable the shift indicator, if the owner has not selected the shift aid. The procedure 202 proceeds to block 218 if the owner has selected the shift aid.

At block 218, the ECU 106 determines whether speed control management is inactive. In other words, in one embodiment, it may be desirable for the shift indicator to be enabled if speed control management is inactive, and to not be enabled if speed control management is active. In one embodiment, speed control management is an owner-programmable engine control strategy that lowers an acceleration rate of the engine (e.g., progressive shifting) in lower gears and provides a hard engine speed limit (e.g., gear down protect) in higher gears. Speed control management is an alternative scheme to encourage shift events at lower engine speeds and to maximize time in higher gears for higher vehicle speeds, both of which lower fuel consumption. If speed control management is being used to lower fuel consumption, use of the shift indicator may be unnecessary. At decision block 220, the procedure 202 proceeds to block 230, and does not enable the shift indicator, if speed control management is active. If speed control management is inactive, the procedure 202 proceeds to block 222.

At block 222, the ECU 106 determines whether a driveline state is in a proper state. For example, in one embodiment, a transmission may be capable of operating in an automatic mode or in a manual mode. In this case, the driveline may be considered in a proper state when configured in manual mode, and not when configured in automatic mode, as a shift indicator is not necessary when configured in automatic mode. As another example, a driveline may include a power take off unit. In this case, the driveline may be considered in a proper state when the power take off is not active, and not when the power take off is active, since the operator is unlikely to be concerned with transmission efficiency while the power take off unit is active. At decision block 224, the procedure 202 proceeds to block 230, and does not enable the shift indicator, if the driveline is not in a proper state. If the driveline is in a proper state, the procedure 202 proceeds to block 226.

At block 226, the ECU 106 determines whether one or more owner-specified thresholds are met. In one embodiment, the ECU 106 retrieves owner-specified thresholds from the programmable setting store 108. For example, the ECU 106 may retrieve one or more of a minimum vehicle speed ($V_{min}$) value, a disable gear ratio (DGR) value, and a maximum gear ratio (MGR) value from the programmable setting store 108. The ECU 106 may then retrieve a current value for a vehicle speed from the engine sensor module 110, may retrieve a current value for a gear ratio from the transmission sensor module 114, and may compare those current values to the values retrieved from the programmable setting store 108. The ECU 106 may check to make sure that each of the thresholds specified by the settings is met. For example, the ECU 106 may ensure that the current value for the vehicle speed is greater than or equal to the $V_{min}$ value, that the current gear ratio is less than or equal to the MGR value, and/or that the current gear ratio is greater than or equal to the DGR value. At decision block 228, the procedure 202 proceeds to block 230, and does not enable the shift indicator, if one or more of the owner-specified thresholds are not met. If each of the owner-specified thresholds is met, the procedure 202 proceeds to block 232, and enables the shift indicator.

Figure 2C:
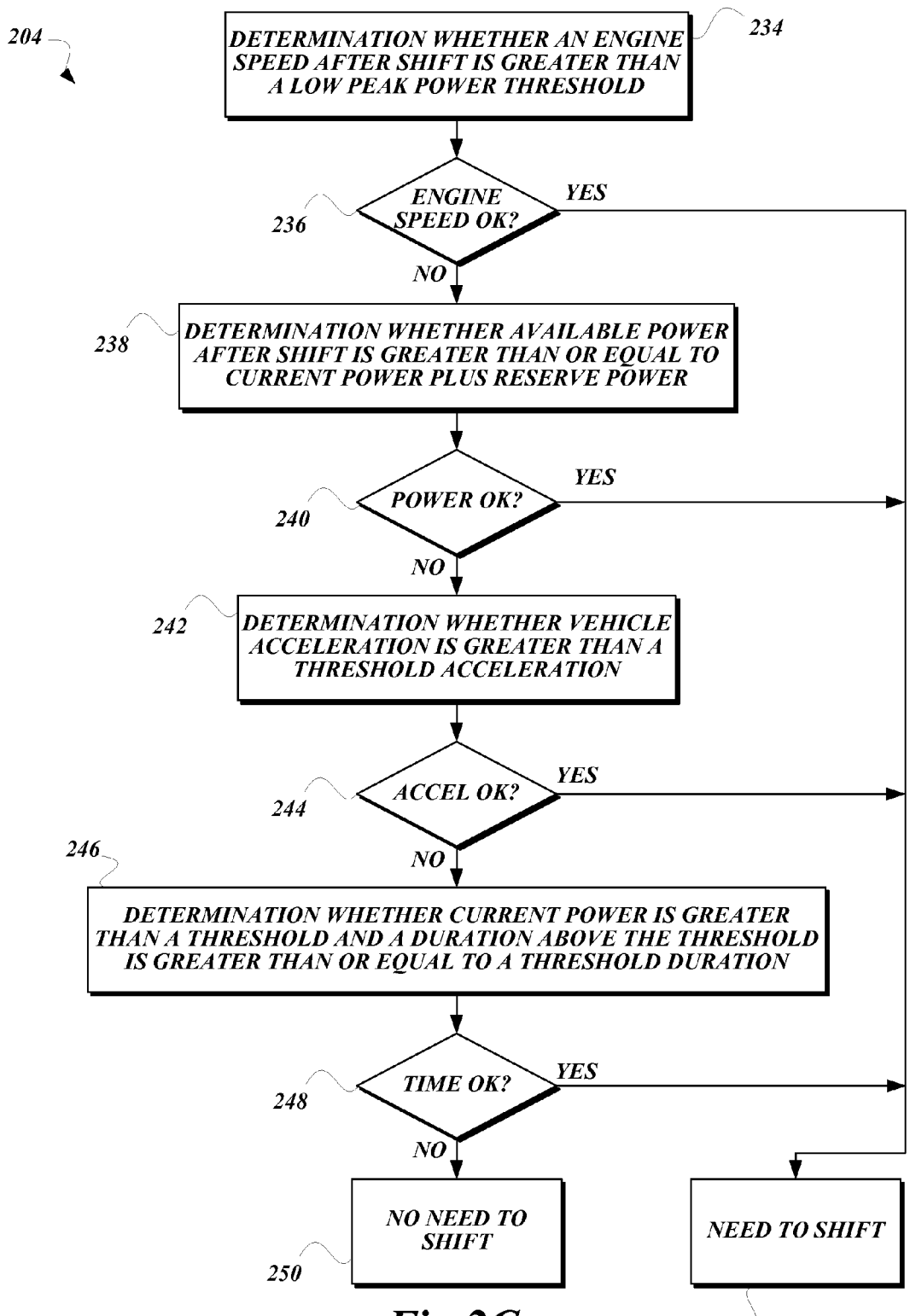

FIG. 2C illustrates further details of one example of a procedure 204 in which an ECU 106, after enabling a shift indicator, monitors vehicle state to detect a need to shift. In the illustrated embodiment, any of the separate detected conditions is adequate to indicate a need to shift. However, in other embodiments, more than one of the conditions may be needed to indicate the need to shift.

At block 234, the ECU 106 determines whether an engine speed after shift is greater than a minimum engine speed for peak power. In one embodiment, the ECU 106 retrieves a value representing a minimum engine speed for peak power from the programmable setting store 108. In another embodiment, the ECU 106 may determine a value representing a minimum engine speed for peak power based on a performance profile stored in the vehicle performance profile store 104. The ECU 106 may also retrieve the current engine speed from the engine sensor module 110 and a current gear from the transmission sensor module 114. The ECU 106 predicts a new engine speed in a higher gear, based in one embodiment at least on the current engine speed and a set of transmission gear ratios that may be retrieved by the ECU 106 from the programmable setting store 108. In another embodiment, the ECU 106 may base the new engine speed on the current vehicle speed instead of the current engine speed. In either case, the ECU 106 compares the new engine speed to the value representing the minimum engine speed for peak power. If the new engine speed after shifting into the higher gear is greater than or equal to the value, the ECU 106 determines that the engine speed after shift is greater than the value, and at decision block 236, the procedure 204 proceeds to block 233, where a need to shift is found. Otherwise, at decision block 236, the procedure 204 may proceed to block 238.

At block 238, the ECU 106 determines whether available power after shift is greater than or equal to a threshold, such as current power, current power plus reserve power, or other similar power value. In one embodiment, the ECU 106 predicts a new engine speed in a higher gear, similar to the discussion above with respect to procedure 204. In this case, the ECU 106 uses the new engine speed to determine available power after shift by consulting a performance profile stored in the vehicle performance profile store 104. The performance profile allows the ECU 106 to determine the available power based on the new engine speed. In one embodiment, the ECU 106 compares this available power to the current power plus a reserve power amount. Use of the reserve power amount may allow driveability to be maintained, as the vehicle may be able to provide more than the current amount of power in the higher gear if, for example, the operator wishes to climb a hill or perform a passing maneuver immediately after shifting to the higher gear. At decision block 240, if the available power is greater than or equal to the current power plus the reserve power, the procedure 204 proceeds to block 233, where a need to shift is found. Otherwise, at decision block 240, the procedure 204 may proceed to block 242.

At block 242, the ECU 106 determines whether vehicle acceleration is greater than a threshold acceleration. One example of a threshold acceleration may be 1 m/s$^2$, though this value is exemplary only. Prompting an operator to upshift when the operator is accelerating too quickly should help to improve fuel economy. The ECU 106 retrieves a threshold acceleration value from the programmable setting store 108, and compares it to the current vehicle acceleration. At decision block 244, if the current vehicle acceleration is greater than or equal to the threshold acceleration value, the procedure 204 proceeds to block 233, where a need to shift is found. Otherwise, at decision block 244, the procedure 204 may proceed to block 246.

At block 246, the ECU 106 determines whether current power is greater than a threshold and a duration of time spent above the threshold is greater than or equal to a threshold duration. If the vehicle has been operating at a high power for a long amount of time, fuel economy may be improved by shifting into a higher gear. The ECU 106 retrieves a power threshold and a power threshold duration from the programmable setting store 108. The ECU 106 then compares the current power received from the engine sensor module 110 to the power threshold.

If the current power is greater than the power threshold, the ECU 106 determines a duration for which the current power has been greater than the power threshold. The ECU 106 may determine the duration by any suitable method known to one of ordinary skill in the art. For example, the ECU 106 may receive a duration value directly from the engine sensor module 110. As another example, the ECU 106 may start a timer after first detecting that current power is greater than the power threshold, and may continually monitor the current power while the timer counts down to the power threshold duration.

At decision block 248, if the current power has remained over the power threshold for at least the power threshold duration, the procedure 204 proceeds to block 233, where a need to shift is found. Otherwise, at decision block 248, the procedure 204 proceeds to block 250, and does not activate the shift indicator.

In one embodiment, at least some portions of the procedure 204 are repeated until a need to shift is found in block 233, or until the vehicle conditions for enabling the shift indicator described with respect to procedure 202 are no longer met.

Figure 2D:
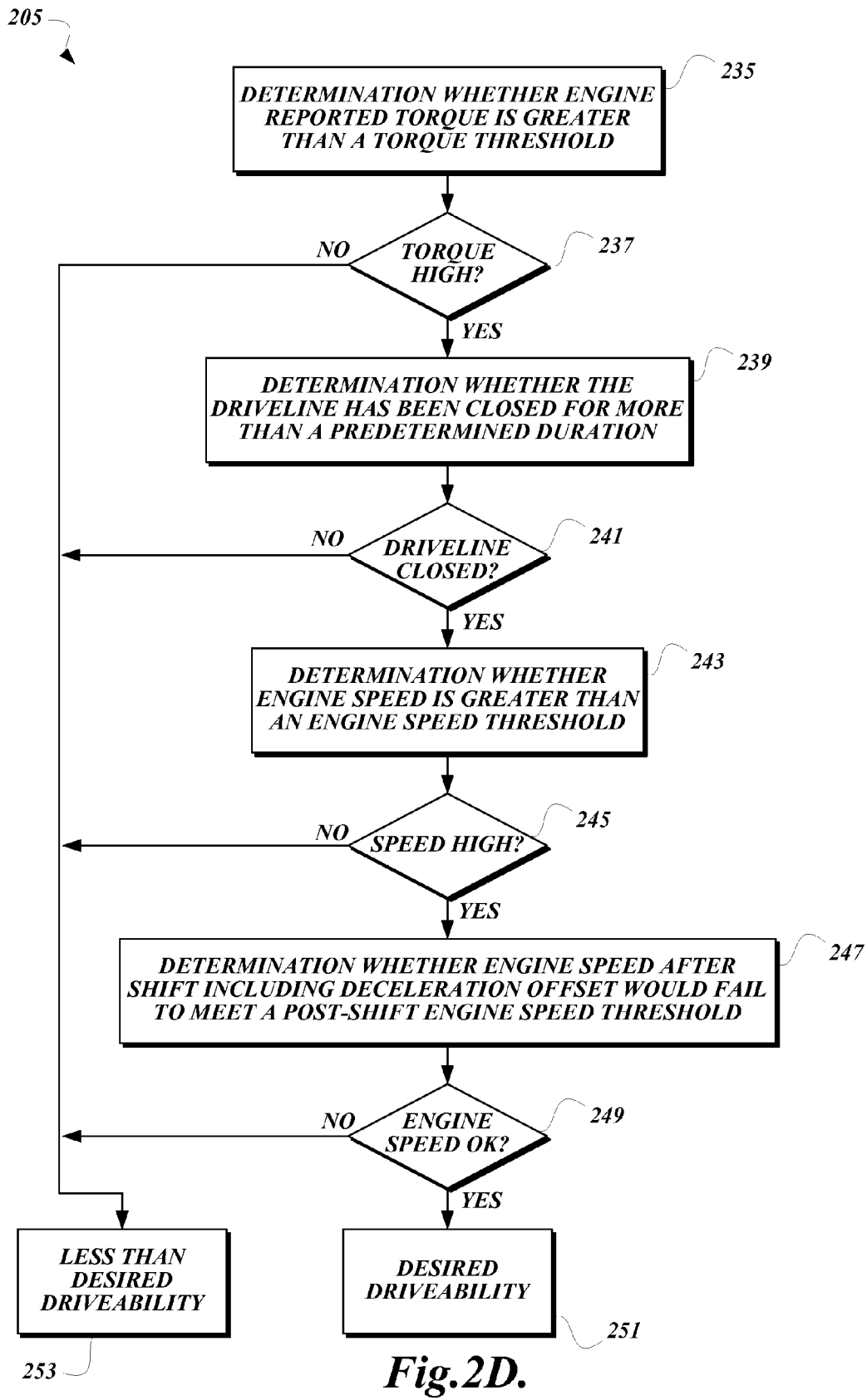

FIG. 2D illustrates further details of one example of a procedure 205 in which an ECU 106, after enabling a shift indicator, monitors vehicle state to detect that a predicted minimum driveability is maintained after a shift. As an overview of the procedure 205, the ECU 106 may perform various driveability tests. If any of the tests indicate that less than desired driveability would be available after shifting, the procedure 205 determines that less than desired driveability would be provided. If all of the tests indicate that desired driveability would be available after shifting, the procedure 205 determines that desired driveability would be provided. In the illustrated embodiment, all of the driveability tests must succeed in order for desired driveability to be determined. However, in other embodiments, desired driveability may be determined by the success of one driveability test, or a combination of more than one driveability test.

At block 235, the ECU 106 determines whether engine reported torque is greater than a torque threshold. The ECU 106 may obtain the engine reported torque from the engine sensor module 110, and may obtain the torque threshold from the programmable setting store 108. At decision block 237, if the engine reported torque is less than the torque threshold, the procedure 205 proceeds to block 253, wherein less than desired driveability after shifting is predicted.

Otherwise, at decision block 237, the procedure 205 proceeds to block 239, where the ECU 106 determines whether the driveline has been closed (e.g., the clutch has been engaged) for more than a predetermined duration. In one embodiment, this should ensure that the current gear has been selected for the predetermined duration, and may help to prevent the shift indicator from suggesting excessive gear hunting behavior. In one embodiment, the ECU 106 obtains a driveline state from the transmission sensor module 114. Once the ECU 106 detects that the driveline is closed, the ECU 106 may monitor the driveline state by repeatedly checking the driveline state to determine a duration for which the driveline is closed. In another embodiment, the ECU 106 may receive duration information concerning the driveline state from the transmission sensor module 114. The predetermined duration value may be retrieved by the ECU 106 from the programmable setting store 108. At decision block 241, if the driveline has been closed for less than the predetermined duration, the procedure 205 proceeds to block 253, wherein less than desired driveability after shifting is predicted.

Otherwise, at decision block 241, the procedure 205 proceeds to block 243, where the ECU 106 determines whether engine speed is greater than an engine speed threshold. The ECU 106 retrieves the engine speed threshold, such as the DSAESL value, from the programmable setting store 108. In another embodiment, the engine speed threshold may be a value different from the DSAESL value. As described above, the ECU 106 may receive the engine speed from the engine sensor module 110. At decision block 245, if the engine speed is not above the engine speed threshold, the procedure 205 proceeds to block 253, wherein less than desired driveability after shifting is predicted.

Otherwise, at decision block 245, the procedure 205 proceeds to block 247, wherein the ECU 106 determines whether an engine speed after shift, including a deceleration offset, would fail to meet a post-shift engine speed threshold. The deceleration offset may be used to take into account an amount that the engine would be likely to slow down while the operator releases the throttle to perform the shift. The ECU 106 retrieves the post-shift engine speed threshold and the deceleration offset from the programmable setting store 108. In one embodiment, the post-shift engine speed threshold may be the same engine speed threshold used in block 243, and may be the DSAESL value, a low end of a peak power range, or any other suitable value. As described above, the ECU 106 may predict the engine speed after shift from a combination of inputs, such as a current engine speed, a current gear, a current vehicle speed, a vehicle performance profile, and/or the like. At decision block 249, if the engine speed after shift would fail to meet the post-shift engine speed threshold, including the deceleration offset, the procedure 205 proceeds to block 253, wherein less than desired driveability after shifting is predicted. Otherwise, at decision block 249, the procedure 205 proceeds to block 251, wherein the desired driveability is predicted to be maintained after shifting.

Figure 2E:
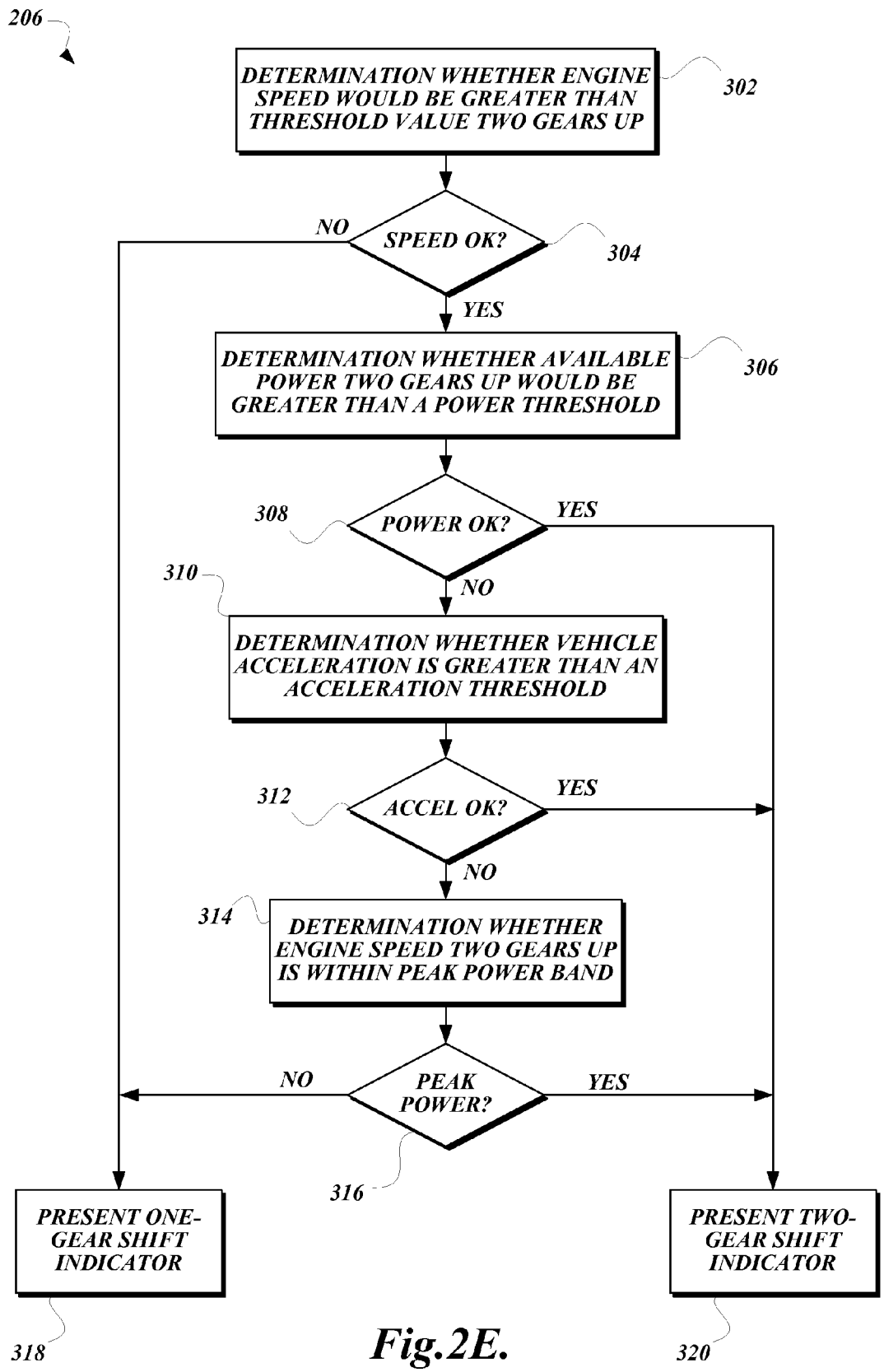

FIG. 2E illustrates one embodiment of a procedure 206 for causing presentation of a shift indicator. As shown in the overall method 200 illustrated in FIG. 2A, procedure 206 is performed after a need to shift has been detected and it is predicted that a desired driveability will be maintained after shifting. In one embodiment, once a need to shift has been detected, a shift indicator that prompts the operator to shift up one gear may be displayed. However, in some vehicles, transmission gear ratios may be so close together that gears higher than the next gear higher than the current gear may provide acceptable driveability. Therefore, in another embodiment, once a need to shift has been detected, procedure 206 may be performed to determine whether to prompt the operator to shift up one gear or to shift up two gears. In yet other embodiments, the operator may be prompted to shift more than two gears, but only prompts to shift one gear or two gears are discussed herein for ease of discussion.

At block 302, the ECU 106 determines whether engine speed would be greater than a threshold value two gears up from the current gear. This determination is similar to the determination performed in block 243, wherein a threshold engine speed, such as the DSAESL value, is compared to a predicted new engine speed in the new gear. However, whereas the determination in block 243 may have been performed based on the next gear higher than a current gear, the determination in block 302 is performed based on a gear two gears higher than the current gear. At decision block 304, if the engine speed two gears up from the current gear would not be greater than the threshold value, then the procedure 206 proceeds to block 318, wherein the one-gear shift indicator is presented. Otherwise, if the engine speed two gears up from the current gear would be greater than the threshold value, the procedure 206 may proceed to block 306.

At block 306, the ECU 106 determines whether available power two gears up would be greater than a power threshold. Again, this determination is similar to the determination performed in block 238, wherein a predicted power in the new gear is determined based at least on a predicted new engine speed and a performance profile. However, whereas the determination in block 238 may have been performed based on the next gear higher than a current gear, the determination in block 306 is performed based on a gear two gears higher than the current gear. The determination may also include determining whether adequate reserve power will be available two gears higher than the current gear. At decision block 308, if the available power is greater than the power threshold, the procedure 206 proceeds to block 320, wherein the two-gear shift indicator is presented. Otherwise, if the available power two gears higher than the current gear is not greater than the power threshold, the procedure 206 may proceed to block 310.

In block 310, a test similar to the test from block 242 is performed. That is, the ECU 106 determines whether vehicle acceleration is greater than an acceleration threshold. At decision block 312, if vehicle acceleration is indeed greater than the acceleration threshold, the procedure 206 proceeds to block 320, wherein the two-gear shift indicator is presented. Otherwise, if vehicle acceleration is not greater than the acceleration threshold, the procedure 206 may proceed to block 314.

In block 314, the ECU 106 determines whether a predicted engine speed two gears up from the current gear is within a peak power band. Some engines may provide a peak amount of power over a wide range of engine speeds. The engine may run most efficiently within this band, and it may be beneficial to refrain from prompting an operator to shift to a gear two gears higher than the current gear if it would cause the engine to perform outside of this band. As discussed above, the ECU 106 may predict the engine speed two gears up from the current gear based at least in part on the current vehicle speed, the current engine speed, and/or the like. At decision block 316, if the ECU 106 determines that a two-gear shift would cause the engine speed to be outside of the peak power band, the procedure 206 proceeds to block 318, wherein the one-gear shift indicator is presented. Otherwise, if the ECU 106 determines that a two-gear shift would cause the engine speed to be inside of the peak power band, prerequisites for presenting the two-gear shift in the illustrated embodiment have been met, and so the procedure 206 proceeds to block 320, wherein the two-gear shift indicator is presented. It will be appreciated that in some embodiments, some or all of the steps performed in procedure 206 may be performed sequentially, and in other embodiments, some or all of the steps performed in procedure 206 may be performed at the same time or at overlapping times. It will also be appreciated that in some embodiments, not all of the steps from block 302 to block 316 may be used to determine whether to present the one-gear shift indicator or the two-gear shift indicator, or other steps not illustrated may also be used.

Figure 2F:
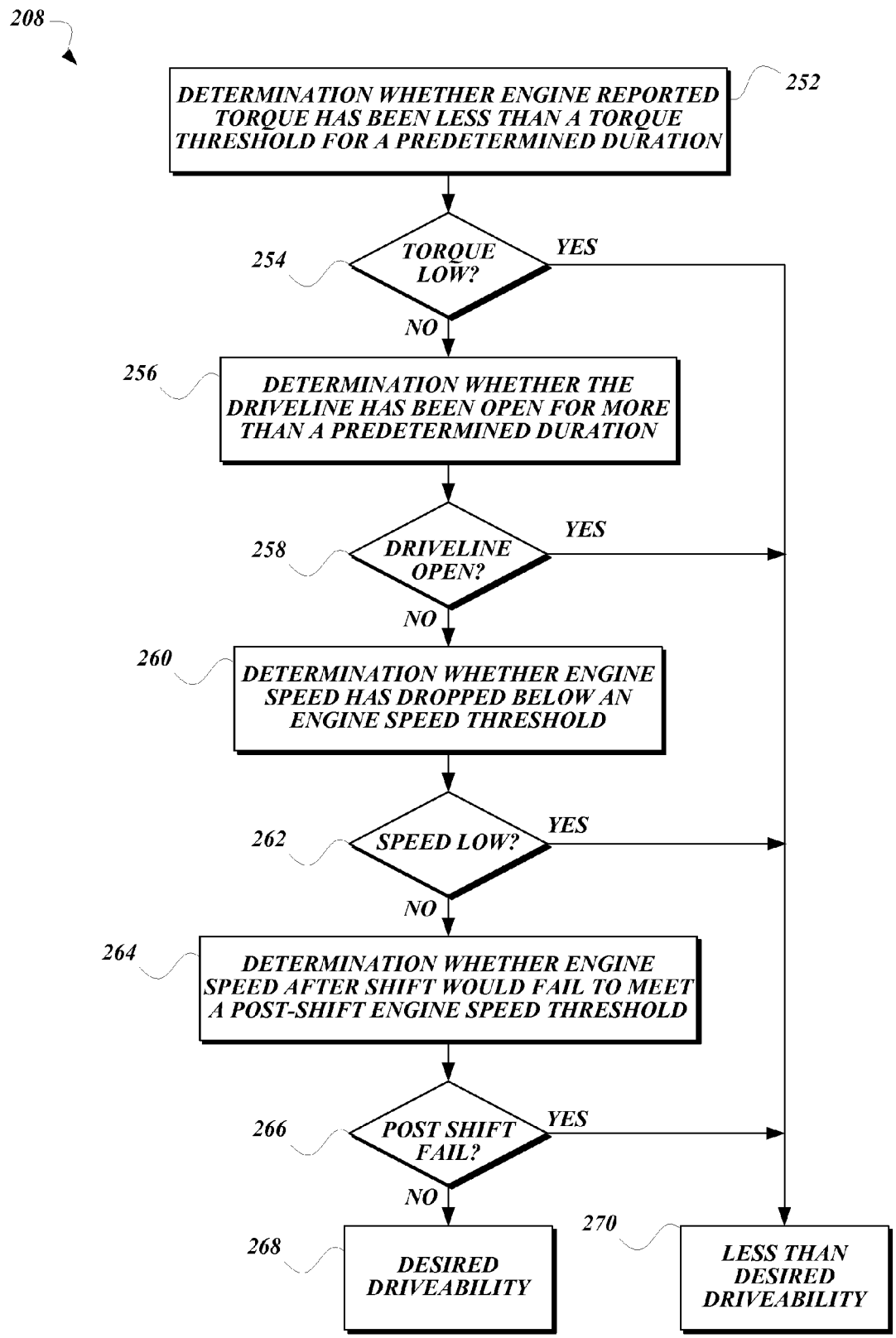

FIG. 2F illustrates one embodiment of a procedure 208 performed while a shift indicator is presented wherein the ECU 106, while monitoring vehicle status, checks for less than desired driveability. As an overview of the procedure 208, the ECU 106 may perform various driveability tests. If any of the tests indicate that less than desired driveability would be available after shifting, the procedure 208 proceeds to block 270, where less than desired driveability is indicated, and would cause the method 200 illustrated in FIG. 2A to proceed to block 212 and end the presentation of the shift indicator. In other embodiments, more than one of the tests may need to indicate that less than desired driveability would be available after shifting before less than desired driveability is indicated.

At block 252, the ECU 106 determines whether engine reported torque has been less than a torque threshold for a predetermined duration. The ECU 106 may obtain the engine reported torque from the engine sensor module 110, and may obtain the torque threshold and the predetermined duration from the programmable setting store 108. As discussed above, once the ECU 106 determines that the engine reported torque is less than the torque threshold, the ECU 106 may determine the duration for which the engine reported torque has been below the threshold by any suitable method, such as by receiving a duration value from the engine sensor module 110, by repeated sampling during the duration period, and/or the like. At decision block 254, if the engine reported torque has been below the torque threshold for at least the predetermined duration, the procedure 208 proceeds to block 270, wherein less than desired driveability is indicated.

Otherwise, at decision block 254, the procedure 208 proceeds to block 256, where the ECU 106 determines whether the driveline has been open (e.g., the clutch has been disengaged) for more than a predetermined duration. In one embodiment, the ECU 106 obtains a driveline state from the transmission sensor module 114. Once the ECU 106 detects that the driveline is open, the ECU 106 may monitor the driveline state by repeatedly checking the driveline state to determine a duration for which the driveline is open. In another embodiment, the ECU 106 may receive duration information concerning the driveline state from the transmission sensor module 114. The predetermined duration value may be retrieved by the ECU 106 from the programmable setting store 108. At decision block 258, if the driveline has been open for more than the predetermined duration, the procedure 208 proceeds to block 270, wherein less than desired driveability is indicated.

Otherwise, at decision block 258, the procedure 208 proceeds to block 260, where the ECU 106 determines whether engine speed has dropped below an engine speed threshold. The ECU 106 retrieves the engine speed threshold, such as the DSAESL value, from the programmable setting store 108. In another embodiment, the engine speed threshold may be a value different from the DSAESL value, or may be the DSAESL value plus or minus a hysteresis amount. As described above, the ECU 106 may receive the engine speed from the engine sensor module 110. At decision block 262, if the engine speed has dropped below the engine speed threshold, the procedure 208 proceeds to block 270, wherein less than desired driveability is indicated.

Otherwise, at decision block 262, the procedure 208 proceeds to block 264, where the ECU 106 determines whether engine speed after shift would fail to meet a post-shift engine speed threshold. The ECU 106 retrieves the post-shift engine speed threshold from the programmable setting store 108. In one embodiment, the post-shift engine speed threshold may be the same engine speed threshold used in block 260, and may be the DSAESL value. In another embodiment, a different post-shift engine speed threshold may be used, and/or a deceleration offset may be included. As described above, the ECU 106 may predict the engine speed after shift from a combination of inputs, such as a current engine speed, a current gear, a current vehicle speed, a vehicle performance profile, and/or the like. At decision block 266, if the engine speed after shift would fail to meet the post-shift engine speed threshold, the procedure 208 proceeds to block 270, wherein less than desired driveability is indicated.

Otherwise, at decision block 266, the procedure 208 proceeds to block 268, where desired driveability is indicated. In one embodiment, from block 268, at least some portions of the procedure 208 may be repeated until either less than desired driveability is detected, until the indicated shift is performed, or until the vehicle conditions for enabling the shift indicator described with respect to procedure 202 are no longer met.

Figure 2G:
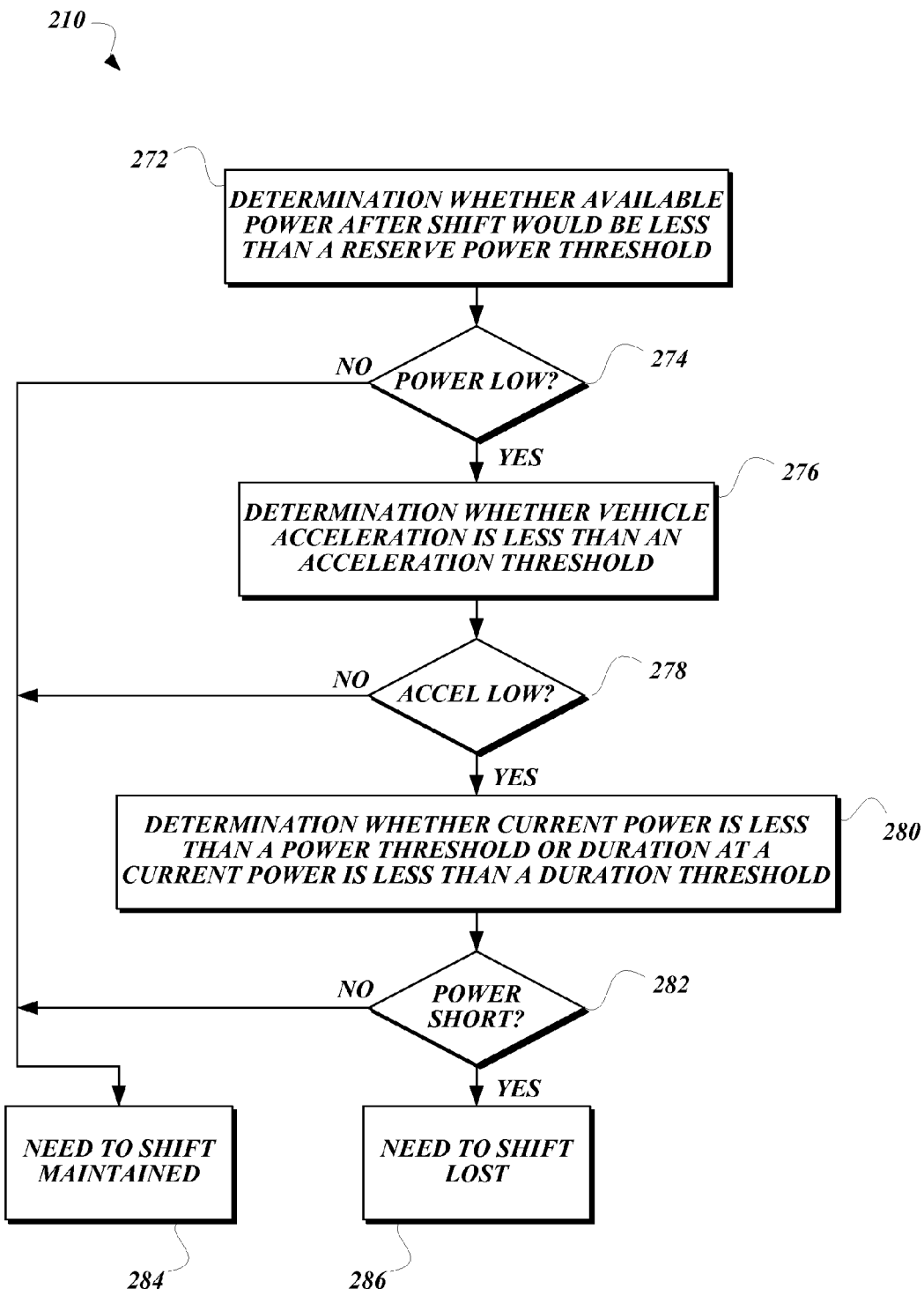

FIG. 2G illustrates one embodiment of a procedure 210 performed while a shift indicator is presented wherein the ECU 106, while monitoring vehicle status, detects a lost need to shift. As an overview of the procedure 210, the ECU 106 performs various tests to determine if the need to shift still exists. In the illustrated embodiment, if all of the tests indicate that there is no longer any need to shift, the procedure 210 proceeds to block 286, where the lost need to shift is indicated, and would cause the method 200 illustrated in FIG. 2A to proceed to block 212 and end the presentation of the shift indicator. In other embodiments, presentation of the shift indicator may be ended if less than all of the tests indicate a lack of a need to shift.

At block 272, the ECU 106 determines whether available power after shift would be less than a reserve power threshold. Similar to the discussion above with respect to block 238 of FIG. 2C, the ECU 106 may predict a new engine speed in a higher gear, and use the new engine speed to determine available power after shift by consulting a performance profile stored in the vehicle performance profile store 104. The ECU 106 compares this available power to the reserve power threshold. In one embodiment, the reserve power threshold may be based on the current power. In another embodiment, the reserve power threshold may be based on a power level that was current when the shift indicator was first activated. At decision block 274, if the available power after shift would not be less than the reserve power threshold, the procedure 210 proceeds to block 284, wherein the need to shift is maintained. If, at decision block 274, the available power after shift would be less than the reserve power threshold, the procedure 210 proceeds to block 276.

At block 276, the ECU 106 determines whether vehicle acceleration is less than an acceleration threshold. Similar to the discussion above with respect to block 242 of FIG. 2C, the ECU 106 may retrieve a threshold acceleration value from the programmable setting store 108, and may compare it to a current vehicle acceleration received from an engine sensor module 110, a transmission sensor module 114, an auxiliary system sensor module 112, and/or the like. At decision block 278, if the vehicle acceleration is greater than or equal to the acceleration threshold, the procedure 210 proceeds to block 284, wherein the need to shift is maintained. If, at decision block 278, the vehicle acceleration is less than the acceleration threshold, the procedure 210 proceeds to block 280.

At block 280, the ECU 106 determines whether current power is less than a power threshold. The ECU 106 also determines whether a duration at a current power is less than a duration threshold. As described above, the thresholds may be retrieved from the programmable setting store 108, and the current power may be retrieved from a sensor such as the engine sensor module 110. As also described above, the duration at the current power may be determined by the ECU 106 repeatedly monitoring the current power, or may be received by the ECU 106 from the engine sensor module.

At decision block 282, if the current power is not less than the power threshold and if the duration at the current power is not less than the duration threshold, the procedure 210 proceeds to block 284, wherein the need to shift is maintained. If, at decision block 282, the current power is less than the power threshold or if the duration at the current power is less than the duration threshold, the procedure 210 proceeds to block 286, where it is indicated that the need to shift is lost.

In one embodiment, from block 284, at least some portions of the procedure 210 may be repeated until either the need to shift is lost, the indicated shift is performed, or until the vehicle conditions for enabling the shift indicator described with respect to procedure 202 are no longer met.

The above discussion primarily refers to actions performed by a single ECU for ease of discussion only. It will be appreciated that in some embodiments, a vehicle in which the method 200 is performed may contain more than one ECU, and the actions described herein as performed by "the ECU" may be performed by a single ECU of the vehicle or may be performed by several ECUs of the vehicle without departing from the scope of the present disclosure.

Figure 3A:
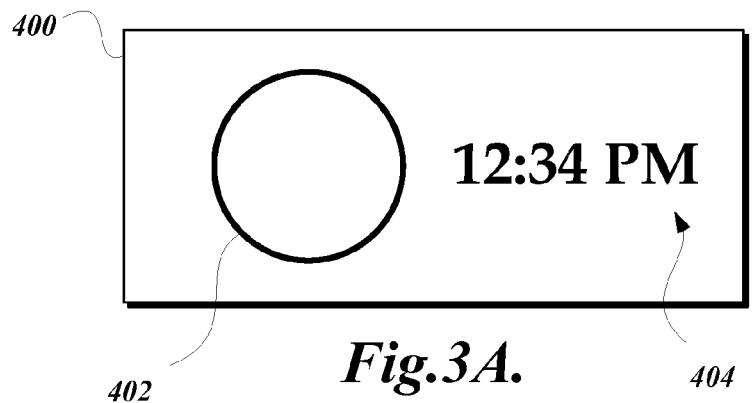
FIGS. 3A-3C illustrate one embodiment of a display 400 including a shift indicator, according to various aspects of the present disclosure.
Figure 3B:
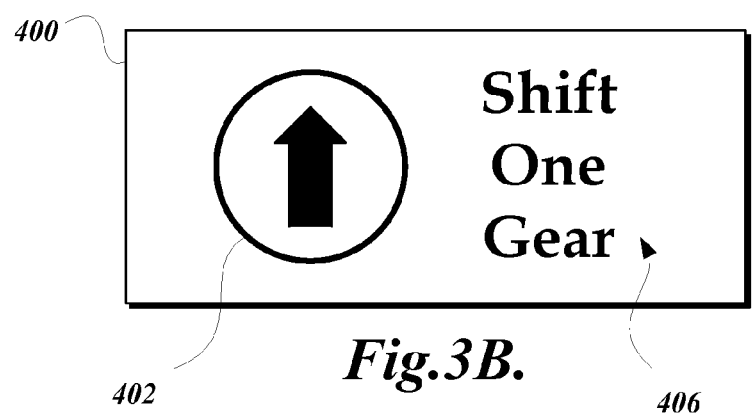
Figure 3C:
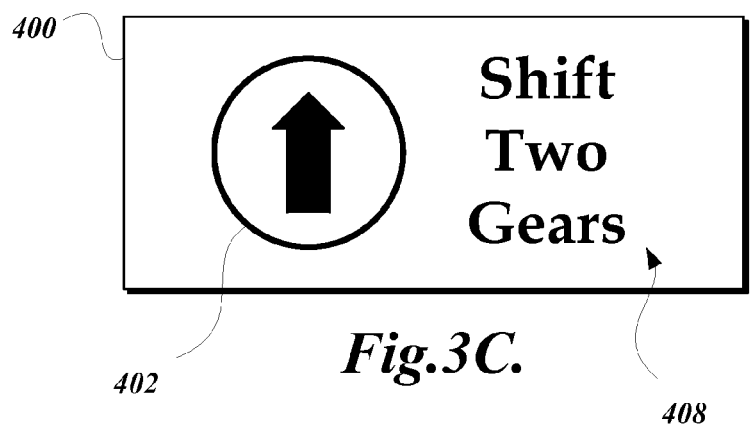

FIGS. 3A-3C illustrate one embodiment of a display 400 including a shift indicator, according to various aspects of the present disclosure. FIG. 3A illustrates a display 400 with an inactive shift indicator 402. The display 400 may be any suitable type of display, such as an LCD screen mounted on a dashboard, a lighted instrument display, and/or the like. The display 400 may also include an informational area 404. As illustrated, the informational area 404 is displaying a current time, since the shift indicator 402 is not active. In other embodiments, the informational area 404 may remain blank, or may contain different information when the shift indicator 402 is inactive.

FIG. 3B illustrates a display 400 with an active shift indicator 402. The shift indicator 402 shows a visual indicator prompting the operator to shift up. The informational area 404 is displaying text that explains the action the operator should take in response to the shift indicator 402. As illustrated, the informational area 404 states that the operator should shift one gear.

FIG. 3C illustrates a display 400 in which the shift indicator 402 is active, and the informational area 404 states that the operator should shift two gears. In other embodiments, the two gear shift notification may include a different icon for the shift indicator 402, a different color for the shift indicator 402, and/or the like.

The displays described herein are exemplary only, as any other suitable way of instructing the vehicle operator to upshift could be used without departing from the scope of the present disclosure. For example, a number of an ideal gear could be displayed. As another example, an audio indicator such as a tone or voice could be presented instead of, or in addition to, the visual indicator.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A method for presenting a shift indicator in a vehicle, the method comprising:
   monitoring one or more vehicle performance characteristics;
   determining, based on the vehicle performance characteristics, that fuel consumption would be lowered by switching to a different transmission gear ratio of a manual transmission of the vehicle;

determining, based on the vehicle performance characteristics, that minimum driveability would be maintained after switching to the different transmission gear ratio; and presenting a shift indicator instructing an operator of the vehicle to switch to the different transmission gear ratio in response to determining that fuel consumption would be lowered and minimum driveability would be maintained.

2. The method of claim 1, further comprising determining, based on the vehicle performance characteristics, that presentation of a shift indicator is enabled.

3. The method of claim 1, further comprising ceasing presentation of the shift indicator in response to determining that minimum driveability would no longer be maintained after switching to the different transmission gear ratio.

4. The method of claim 1, further comprising ceasing presentation of the shift indicator in response to determining that fuel consumption would no longer be lowered after switching to the different transmission gear ratio.

5. The method of claim 1, wherein determining that fuel consumption would be lowered by switching to a different transmission gear ratio of a manual transmission of the vehicle includes calculating a predicted engine speed value at the different transmission gear ratio.

6. The method of claim 5, wherein determining that fuel consumption would be lowered by switching to a different transmission gear ratio of a manual transmission of the vehicle includes comparing the predicted engine speed value to a minimum engine speed for peak power value.

7. The method of claim 5, wherein determining that fuel consumption would be lowered by switching to a different transmission gear ratio of a manual transmission of the vehicle includes:
predicting an available power based on the predicted engine speed; and
comparing the predicted available power to a current power plus a reserve power amount.

8. The method of claim 1, wherein determining that fuel consumption would be lowered by switching to a different transmission gear ratio of a manual transmission of the vehicle includes:
determining whether a current power value is greater than a threshold power value; and
in response to determining that the current power value is greater than the threshold power value:
determining a duration for which the current power value has been greater than the threshold power value; and
comparing the duration to a threshold duration.

9. The method of claim 1, wherein determining that minimum driveability would be maintained after switching to the different transmission gear ratio includes determining whether a driveline of the vehicle has been closed for more than a predetermined duration.

10. The method of claim 1, wherein determining that minimum driveability would be maintained after switching to the different transmission gear ratio includes:
predicting an engine speed value at the different transmission gear ratio based on the different transmission gear ratio and a deceleration offset; and
comparing the predicted engine speed value to an engine speed threshold.

11. A method for lowering fuel consumption in a vehicle, the method comprising:

detecting a need to shift based on a plurality of current vehicle operating conditions, the vehicle operating in a first transmission gear;
calculating a first predicted vehicle operating condition based on switching to a second transmission gear;
calculating a second predicted vehicle operating condition based on switching to a third transmission gear;
comparing the first predicted vehicle operating condition and the second predicted vehicle operating condition to a desired vehicle operating condition;
presenting a prompt to a vehicle operator to switch to the second transmission gear in response to determining that the second transmission gear and not the third transmission gear meets the desired vehicle operating condition; and
presenting a prompt to the vehicle operator to switch to the third transmission gear in response to determining that the third transmission gear meets the desired vehicle operating condition.

12. The method of claim 11, wherein the second transmission gear is adjacent to the first transmission gear.

13. The method of claim 12, wherein the third transmission gear is adjacent to the second transmission gear.

14. The method of claim 11, wherein the desired vehicle operating condition includes a desired driveability of the vehicle.

15. A system for presenting a shift indicator in a vehicle, the system comprising:
one or more electronic control units configured to:
monitor one or more vehicle performance characteristics;
determine, based on the vehicle performance characteristics, that fuel consumption would be lowered by switching to a different transmission gear ratio of a manual transmission of the vehicle;
determine, based on the vehicle performance characteristics, that minimum driveability would be maintained after switching to the different transmission gear ratio; and
present a shift indicator instructing an operator of the vehicle to switch to the different transmission gear ratio in response to determining that fuel consumption would be lowered and minimum driveability would be maintained.

16. The system of claim 15, wherein the one or more electronic control units are further configured to determine, based on the vehicle performance characteristics, that presentation of a shift indicator is enabled.

17. The system of claim 15, wherein the one or more electronic control units are further configured to cease presentation of the shift indicator in response to determining that minimum driveability would no longer be maintained after switching to the different transmission gear ratio.

18. The system of claim 15, wherein the one or more electronic control units are further configured to cease presentation of the shift indicator in response to determining that fuel consumption would no longer be lowered after switching to the different transmission gear ratio.

19. The system of claim 15, wherein determining that fuel consumption would be lowered by switching to a different transmission gear ratio of a manual transmission of the vehicle includes calculating a predicted engine speed value at the different transmission gear ratio.

20. The system of claim 19, wherein determining that fuel consumption would be lowered by switching to a different transmission gear ratio of a manual transmission of the vehicle includes comparing the predicted engine speed value to a minimum engine speed for peak power value.

21. The system of claim 19, wherein determining that fuel consumption would be lowered by switching to a different transmission gear ratio of a manual transmission of the vehicle includes:
   predicting an available power based on the predicted engine speed; and
   comparing the predicted available power to a current power plus a reserve power amount.

22. The system of claim 15, wherein determining that fuel consumption would be lowered by switching to a different transmission gear ratio of a manual transmission of the vehicle includes:
   determining whether a current power value is greater than a threshold power value; and
   in response to determining that the current power value is greater than the threshold power value:
      determining a duration for which the current power value has been greater than the threshold power value; and
      comparing the duration to a threshold duration.

23. The system of claim 15, wherein determining that minimum driveability would be maintained after switching to the different transmission gear ratio includes determining whether a driveline of the vehicle has been closed for more than a predetermined duration.

24. The system of claim 15, wherein determining that minimum driveability would be maintained after switching to the different transmission gear ratio includes:
   predicting an engine speed value at the different transmission gear ratio based on the different transmission gear ratio and a deceleration offset; and
   comparing the predicted engine speed value to an engine speed threshold.

* * * * *